(12) United States Patent
Lee et al.

(10) Patent No.: US 9,569,618 B2
(45) Date of Patent: Feb. 14, 2017

(54) SERVER AND METHOD FOR ATTESTING APPLICATION IN SMART DEVICE USING RANDOM EXECUTABLE CODE

(71) Applicant: Korea University Research and Business Foundation, Seoul (KR)

(72) Inventors: Heejo Lee, Seoul (KR); Chanyoung Lee, Seoul (KR); Dongwon Seo, Anyang-si (KR); Jihwan Jeong, Pyeongtaek-si (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 115 days.

(21) Appl. No.: 14/320,801

(22) Filed: Jul. 1, 2014

(65) Prior Publication Data
US 2015/0067855 A1     Mar. 5, 2015

(30) Foreign Application Priority Data

Aug. 28, 2013    (KR) .................. 10-2013-0102693
Dec. 17, 2013    (KR) .................. 10-2013-0157471

(51) Int. Cl.
    *G06F 21/56*     (2013.01)
    *H04L 29/06*     (2006.01)
    *H04W 12/12*     (2009.01)

(52) U.S. Cl.
    CPC ......... *G06F 21/564* (2013.01); *H04L 63/1433* (2013.01); *H04L 63/145* (2013.01); *H04W 12/12* (2013.01)

(58) Field of Classification Search
    CPC ............ H04L 63/1416; H04L 63/1408; H04L 63/1441; H04L 63/1458; G06F 21/552
(Continued)

(56) References Cited

U.S. PATENT DOCUMENTS 4,227,245 A * 10/1980 Edblad .................... B21B 37/16
                                                          700/95
6,324,669 B1 * 11/2001 Westby ................. G06F 3/0619
                                                          714/805

(Continued)

FOREIGN PATENT DOCUMENTS

| KR | 20-2004-0080845 A | 9/2004 |
|---|---|---|
| KR | 10-2012-0081360 A | 7/2012 |
| KR | 10-1272026 B | 6/2013 |

*Primary Examiner* — Farid Homayounmehr
*Assistant Examiner* — Sanchit Sarker
(74) *Attorney, Agent, or Firm* — Pearne & Gordon LLP

(57) ABSTRACT

The present invention discloses an application attestation server and an application attestation method. Specially, there is provided an application attestation server that attests a certain application in a smart device, the application attestation server comprising: an executable code generation unit configured to generate executable codes for attestation with respect to the application; a transceiver configured to transmit an executable code randomly selected from the generated executable codes to the smart device, and receive a result of execution of the selected executable code with respect to the application from the smart device; a malicious application analysis unit configured to analyze whether the application is a malicious application based on the received result; and an analysis result providing unit configured to provide an analysis result of the malicious application analysis unit to a user. Herein, the executable code generation unit configures to generate the executable codes by randomly combining information relevant to the application.

12 Claims, 7 Drawing Sheets

(58) Field of Classification Search
USPC .................................................. 726/2, 23
See application file for complete search history.

(56) References Cited

U.S. PATENT DOCUMENTS

| | | | | | |
|---|---|---|---|---|---|
| 8,627,081 | B2* | 1/2014 | Grimen | ................ | H04N 7/1675 713/168 |
| 2004/0205411 | A1* | 10/2004 | Hong | .................... | G06F 21/566 714/38.1 |
| 2005/0138365 | A1* | 6/2005 | Bellipady | ............ | H04L 9/3268 713/158 |
| 2006/0100010 | A1* | 5/2006 | Gatto | ...................... | A63F 13/70 463/29 |
| 2007/0005992 | A1* | 1/2007 | Schluessler | ............. | G06F 21/54 713/193 |
| 2008/0115219 | A1* | 5/2008 | Kim | ...................... | G06F 21/563 726/25 |
| 2008/0126797 | A1* | 5/2008 | Kim | ...................... | H04L 9/3263 713/155 |
| 2008/0195868 | A1* | 8/2008 | Asokan | ................... | G06F 21/64 713/176 |
| 2012/0076072 | A1* | 3/2012 | Jalfon | ................... | H04W 12/02 370/328 |
| 2012/0201380 | A1* | 8/2012 | Kohiyama | ............ | G06F 21/123 380/255 |
| 2012/0246723 | A1* | 9/2012 | Lee | ......................... | G06F 21/83 726/22 |
| 2013/0060890 | A1* | 3/2013 | Lee | ..................... | G06F 11/1464 709/217 |
| 2013/0117808 | A1* | 5/2013 | Shin | ....................... | G06F 21/00 726/1 |
| 2013/0219498 | A1* | 8/2013 | Lee | ......................... | G06F 21/56 726/23 |
| 2014/0040630 | A1* | 2/2014 | Swaminathan | ......... | G06F 21/10 713/187 |
| 2014/0096246 | A1* | 4/2014 | Morrissey | ............... | G06F 21/51 726/23 |
| 2014/0149964 | A1* | 5/2014 | Song | ........................ | G06F 8/38 717/109 |

* cited by examiner

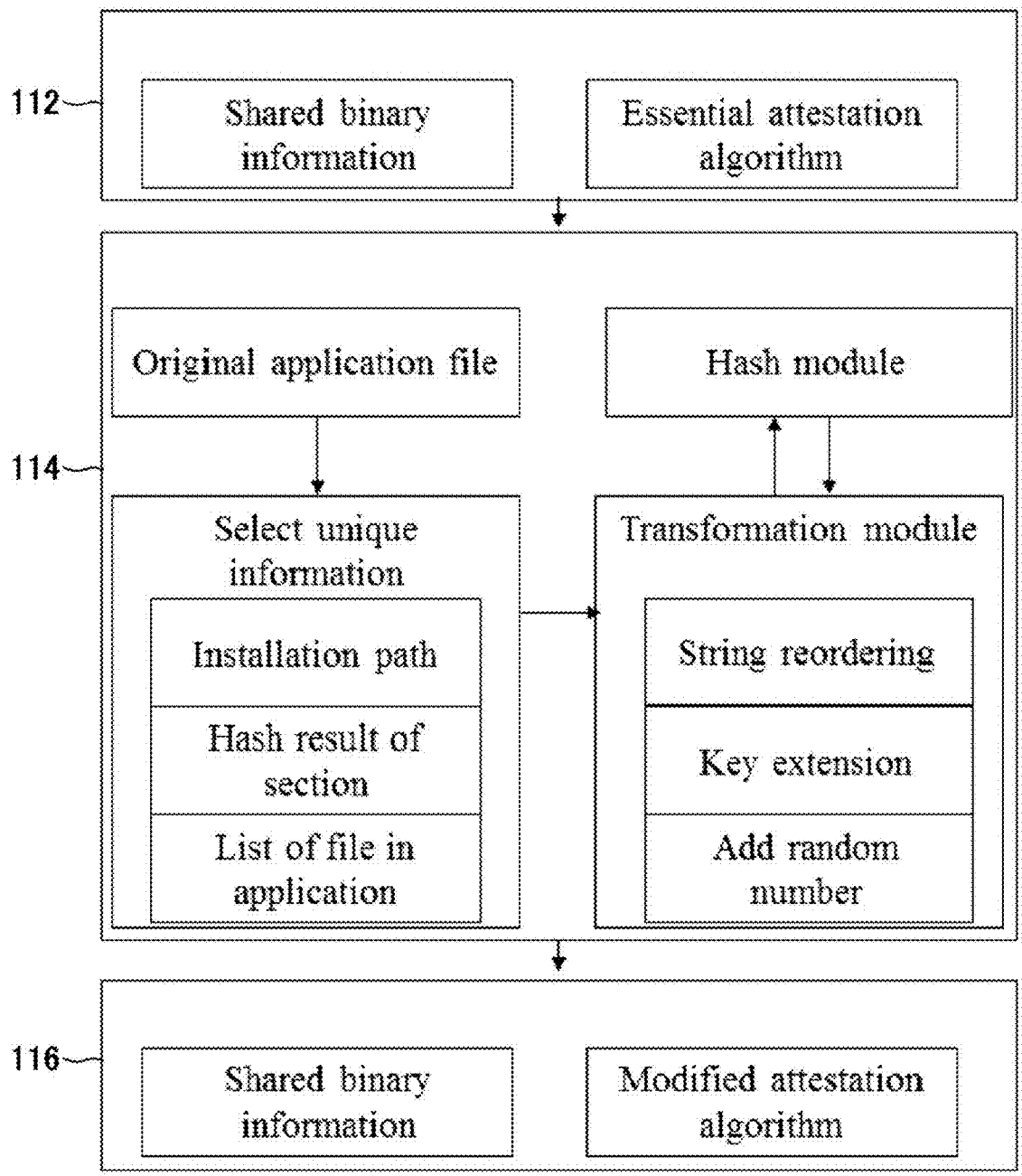

FIG. 4A
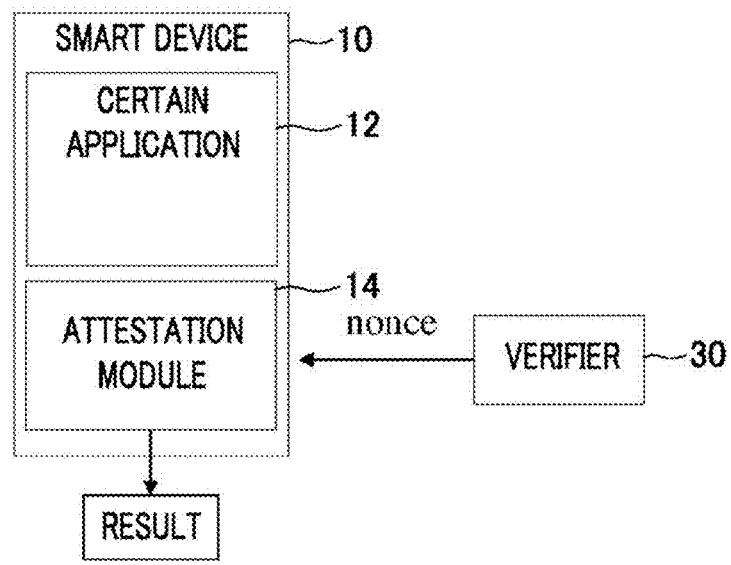
FIG. 4B
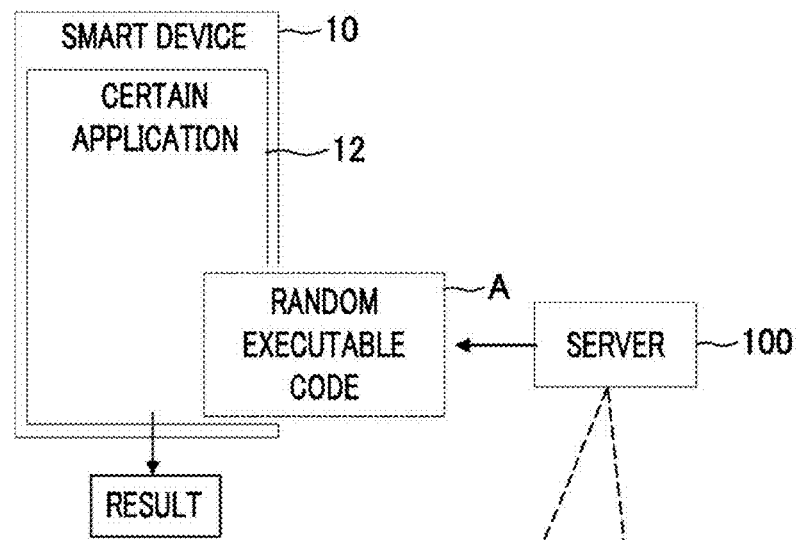
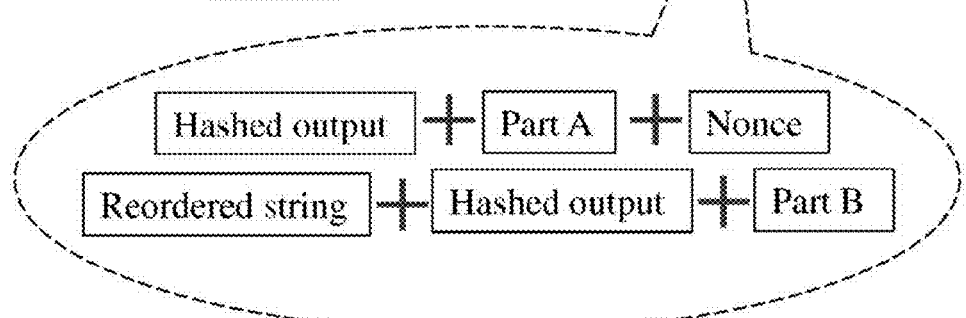

SERVER AND METHOD FOR ATTESTING APPLICATION IN SMART DEVICE USING RANDOM EXECUTABLE CODE

CROSS-REFERENCE TO RELATED APPLICATION

This application claims the benefit of Korean Patent Application No. 10-2013-0102693 filed on Aug. 28, 2013 and Korean Patent Application No. 10-2013-0157471 filed on Dec. 17, 2013, the disclosures of which are incorporated herein by reference.

TECHNICAL FIELD

The embodiments described herein pertain generally to a server and a method for attesting integrity of an application in a smart device, and more particularly, to a server and a method for attesting an application in a smart device and integrity of the application using an unpredictable random executable code.

BACKGROUND

With a recent explosive increase in use of smart devices such as smart phones, tablet PCs, and the like, there also has been a growing interest in applications (apps) directly/indirectly installed in the smart devices. Such smart devices and applications have a positive aspect in that they can be intuitively manipulated and are easy and convenient to use, but also have a negative aspect in that they can be exposed to external attacks due to security problems and there is highly probability of disclosure of personal information by malicious hackers.

In particular, there have been found many malicious software (malware) programs created to perform malicious activities in smart devices such as destroying a system or disclosing information against intention and interests of a user. The malware programs have been installed in smart devices by repackaging in most cases of about 80% or more, and have also been installed by Smishing, malicious URL, etc. A malicious application can be easily repackaged by a hacker or a malicious attacker, and, thus, various variants can be created.

FIG. 1 is a diagram provided for drawing a comparison between an original application and a malicious application.

By way of example, an original application installed in a smart device performs functions 1, 2, and 3, but a malicious application is installed by repackaging and performs a malicious function instated of the function 3. As depicted in FIG. 1, it can be seen that the original application and the malicious application are different in an application execution screen and a user interface. However, it is very possible that such differences can be skillfully fabricated and thus cannot be found or recognized by general users.

Mobile security solutions against such malicious applications have been continuously developed. Currently, for example, selection of a blacklist, the WHISTL program, and a signature and behavior-based malicious application detection program are present.

In this regard, Korean Patent No. 10-1272026 (entitled "System for hacking prevention and control method thereof, server for supporting hacking prevention comprised in the system and control method thereof") discloses a hacking prevention system which can prevent a specific terminal from being easily hacked and further enables an external server to easily recognize its hacked state, and its relevant technology.

To be specific, if a terminal sends an attestation function request signal to a server, the server sends attestation function information including determined attestation function list and attestation function execution sequence (for example, instruction to execute attestation function Nos. 3, 37, 11, 21, 85, and 57 in sequence) to the terminal. Further, the terminal executes an attestation function about a program code relevant to a specific application, and the server compares stored attestation function results and calculated attestation function results, and determine whether the specific application is hacked or not.

However, in Korean Patent No. 10-1272026, there is still a problem that if a specific application in the terminal or multiple attestation functions contained in the specific application are under reverse engineering-based hacking attack, a hacker can predict or extract a valid attestation value to be transmitted to the server based on an analyzed attestation function and thus can also invalidate an attestation method.

SUMMARY

In view of the foregoing, an object of example embodiments is to provide a server and a method capable of attesting whether or not a certain application in a smart device is a malicious application or integrity of the certain application by transmitting an unpredictable random executable code randomly selected form an attestation server to the smart device and executing the code therein.

Further, another object of example embodiments is to provide a server and a method capable of attesting whether or not a certain application is an originally malicious application downloaded from a malicious market and whether or not a certain application, which was downloaded from a normal market, is changed to a malicious application.

However, technical problems to be solved by the example embodiments are limited to the above description, and there may be other technical problems.

In one example embodiment, there is provided an application attestation server that attests a certain application in a smart device, the application attestation server comprising: an executable code generation unit configured to generate executable codes for attestation with respect to the application; a transceiver configured to transmit an executable code randomly selected from the generated executable codes to the smart device, and receive a result of execution of the selected executable code with respect to the application from the smart device; a malicious application analysis unit configured to analyze whether the application is a malicious application based on the received result; and an analysis result providing unit configured to provide an analysis result of the malicious application analysis unit to a user.

Herein, the executable code generation unit configures to generate the executable codes by randomly combining information relevant to the application.

In another example embodiment, there is provided an application attestation method for attesting a certain application in a smart device by a server, the application attestation method comprising: transmitting an executable code randomly selected from executable codes for attestation with respect to the application to the smart device; receiving a result of execution of the selected executable code with respect to the application from the smart device; analyzing whether the application is a malicious application based on the received result; and providing an analysis result of the analyzing process to a user, wherein the executable codes for attestation are generated by randomly combining information relevant to the application.

Herein, the executable codes for attestation is generated by randomly combining information relevant to the application.

In accordance with the various aspects and example embodiments, it is possible to detect unknown variants as well as already-known malicious applications, and with random executable code fragments which cannot be predicted and of which the overall operation cannot be known, it is also possible to effectively respond to attacks based on reverse engineering by which an attestation algorithm is reversely traced and analyzed.

Further, with a server for attesting a certain application in a smart device as described herein, it is possible to find out whether a certain application is altered or not, and also possible to prevent disclosure of personal information or other information before it occurs.

Furthermore, in some example embodiments, by determining the number of attestation request signals, it is possible to attest by distinguishing whether a certain application has been a malicious application since it was downloaded from a certain market or it was normal until it was downloaded from a market but has been altered thereafter.

Moreover, a method for attesting a certain application in a smart device as described herein can be used for personal and institutional security in various banks and the financial industry as well as application production companies.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Non-limiting and non-exhaustive embodiments of the present disclosure will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which:

FIG. 3 is a diagram provided for describing an executable code generation unit of FIG. 2 in more detail;

FIG. 4a-4b is a diagram provided for drawing a comparison between an attestation method using a conventional attestation module and an attestation method using a random executable code as described herein;

DETAILED DESCRIPTION

Figure 1:
FIG. 1 is a diagram provided for drawing a comparison between an original application and a malicious application.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

<Application Attestation Server>

Program attestation is an operation used for checking integrity of a program and has been widely used for a sensor network, an embedded device. Generally, when a verifier transmits challenge data such as random numbers or variables to a device to be attested, an attestation algorithm is executed within the device to be attested and the device to be attested transmits a challenge response to the verifier. However, such a conventional attestation method is vulnerable to network attack or reverse engineering-based hacking attack and an attestation algorithm can be fabricated.

A server (system) for attesting a certain application as described herein can detect unknown variants as well as already-known malicious applications, effectively respond to attacks based on reverse engineering by which an attestation algorithm is reversely traced and analyzed by attackers, and can also require low consumption of resources to reduce a load applied to a device to be attested.

Figure 2:
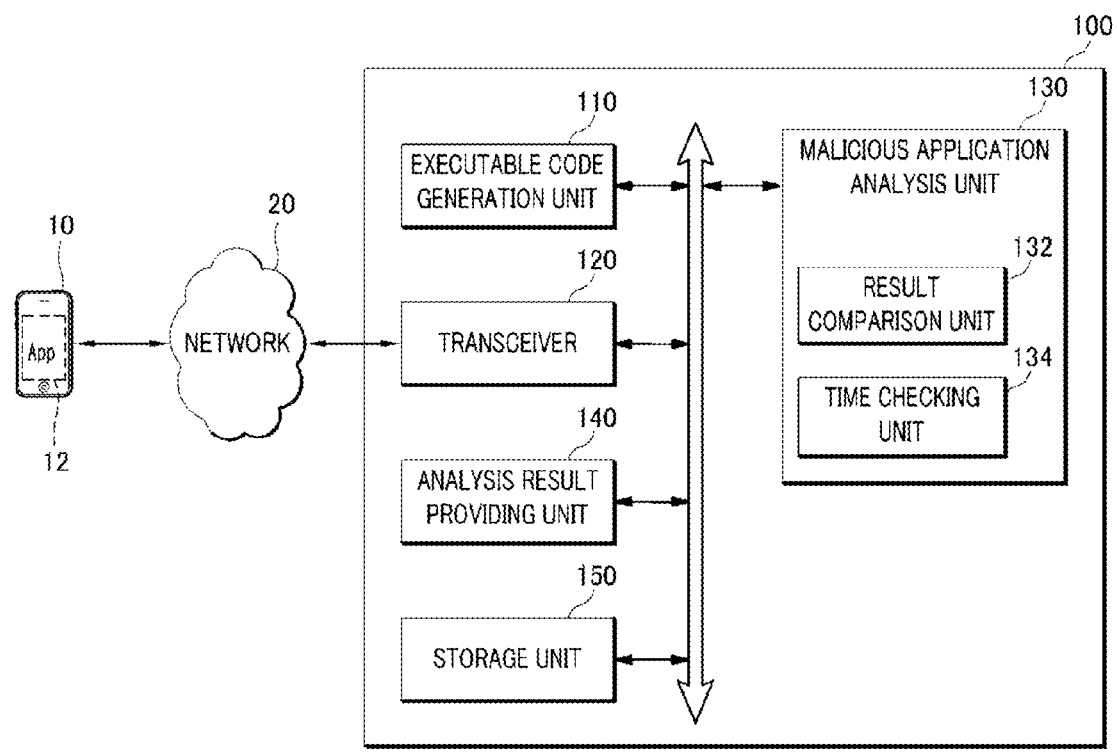
FIG. 2 is a diagram provided for describing a configuration of an application attestation server in accordance with an example embodiment.

FIG. 2 is a diagram provided for describing a configuration of an application attestation server in accordance with an example embodiment.

A server 100 configured to attest a certain application 12 in a smart device 10 includes an executable code generation unit 110, a transceiver 120, a malicious application analysis unit 130 including a result comparison unit 132 and a time checking unit 134, an analysis result providing unit 140, and a storage unit 150.

The smart device 10 as a device to be attested and the application attestation server 100 transmit and receive various data via a network.

Herein, the smart device 10 can be implemented by a computer or a portable terminal. The computer includes home electronics such as a notebook computer, a desktop computer, a laptop computer, a tablet PC, a slate C, and a smart TV equipped with a web browser, and an embedded system including a control configuration corresponding thereto. The portable terminal is, for example, a wireless communication device with guaranteed portability and mobility and may include all kinds of handheld wireless communication devices such as a PCS (Personal Communication System), a GSM (Global System for Mobile communications), a PDC (Personal Digital Cellular), a PHS (Personal Handyphone System), a PDA (Personal Digital Assistant), an IMT (International Mobile Telecommunication)-2000 terminal, a CDMA (Code Division Multiple Access)-2000 terminal, a W-CDMA (W-Code Division Multiple Access) terminal, a WiBro (Wireless Broadband Internet) terminal, and a smart phone. In addition, the smart device 10 is based on Android operating system, but may be applied with other operating systems.

Further, the network 20 can be implemented by wired networks such as a Local Area Network (LAN), a Wide Area Network (WAN), or a Value Added Network (VAN), or all kinds of wireless networks such as a mobile radio communication network or a satellite communication network.

A user can download the certain application 12 from a market and install it in the smart device 10 while using the smart device 10. The certain application 12 may be a basic application already installed when the smart device 10 was released.

The executable code generation unit 110 generates executable codes for attesting the certain application 12 by randomly combining information relevant to the certain application 12.

For reference, an executable code is a computer file that enables execution of an instructed operation in response to encoded commands, unlike a general file that simply contains data. Therefore, the example embodiments are different in that random executable code fragments of which an operation cannot be predicted are used instead of challenge data, for example, random numbers or variables as used in the conventional method.

FIG. 3 is a diagram provided for describing an executable code generation unit of FIG. 2 in more detail.

The executable code generation unit 110 includes a main attestation module 112, an attestation module generator 114, and a revised attestation module 116, and is configured to receive information relevant to the certain application 12 from the storage unit 150 that stores the information, and generate a random executable code. Herein, the information relevant to the certain application 12 may include at least one or more of a specific function, a specific variable, a hash value of the specific variable, a specific string, and a string with a sequence rearranged, which constitute an original application file.

The main attestation module 112 may include shared binary information and an essential attestation algorithm.

The attestation module generator 114 is configured to select unusual information (routing, a hash result of a section, a file list in an application, etc.) from the original application file and generate a random executable code by randomly combining the unusual information together with a hash module. In this process, a string may be rearranged, a key may be extended, and random numbers may be added.

The revised attestation module 116 may include shared binary information and the random executable code generated by the attestation module generator 114.

To be more specific, the executable code in the example embodiments may be generated by results of hash functions are divided into blocks and rearranged. This is a new attestation method differentiated from a conventional method of simply generating an attestation value through a hash function, an attestation method using software obfuscation, and a code signing method of connecting a name of a software developer to a program or an internet applet using a digital signature.

If a hash function is altered, there may be a problem with an anti-backtracking mechanism and a snowball effect, and, thus, a result of a hash function is altered.

In particular, a complexity of a method of altering a result of a hash function can be calculated using a kind of a hash, a method of dividing into blocks, and a method of rearranging blocks.

Herein, assuming that a kind of a hash (the number of hash functions) is I, a size (number) of blocks is m, and a total length of an attestation value (a size of a hash result) is n, a method of dividing results of hash functions into blocks and rearranging the blocks can be expressed by $$\sum_{m=1}^{n} nPm,$$

and a complexity F of the method of altering a result of a hash function can be expressed by the following equation 1.

$$F = \left( \sum_{m=1}^{n} \frac{n!}{(n-m)!} \right) I \qquad \text{[Equation 1]}$$

If a hash of MD5 (Message Digest Algorithm 5) is used, a total length of an attestation value is 32 based on 32 characters.

$$\sum_{m=1}^{32} \frac{32!}{(32-m)!} = 71526377254407932094549529361615142 4 \qquad \text{[Equation 2]}$$

As such, the executable code generation unit 110 may generate an executable code (a randomized result having an unpredictable complexity) having number of cases of about 10^35.

Referring to FIG. 2 again, the transceiver 120 transmits an executable code randomly selected from executable codes generated by the executable code generation unit 110 to the smart device 10.

In one example embodiment, the transceiver 120 may transmit the randomly selected executable code to the smart device 10, when the transceiver 120 receives the attestation request signal from the smart device 10.

In another example embodiment, the transceiver 120 may transmit the randomly selected executable code depending on pre-set or variable schedule to the smart device 10. That is, the transceiver 120 may transmit the randomly selected executable code periodically or aperiodically depending on pre-set or variable schedule to the smart device 10, regardless of receiving an attestation request signal from the smart device 10.

Further, the transceiver 120 receives a result of execution of the selected executable code with respect to the certain application 12 from the smart device 10.

The malicious application analysis unit 130 analyzes whether or not a certain application is a malicious application based on the received result. Herein, a malicious application may be an application obtained by modifying, omitting, adding, or altering a part of an original application file or functions of an original application file.

To be specific, the malicious application analysis unit 130 includes the result comparison unit 132 and the time checking unit 134.

The result comparison unit 132 compares an original result (predicted result) of execution of the selected executable code with respect to an original application in the attestation server 100 with the received result as described above. The malicious application analysis unit 130 determines whether the certain application 12 is a normal application or a malicious application based on a comparison result of the result comparison unit 132.

Further, the time checking unit 134 checks whether a difference between a time for transmitting the selected executable code to the smart device 10 and a time for receiving the above-described result is within a reference time range. The malicious application analysis unit 130 defers or carries out analysis on whether the certain application 12 is a malicious application depending on a check result of the time checking unit 134.

The analysis result providing unit 140 provides an analysis result of the malicious application analysis unit 130 to a user, and a providing method is not specifically limited.

Further, FIG. 4 is a diagram provided for drawing a comparison between an attestation method using a conventional attestation module and an attestation method using a random executable code as described herein.

The conventional attestation method illustrated in FIG. 4A uses an attestation module 14 installed in the smart device 10. The attestation module 14 attests the certain application 12 in the smart device 10 using a nonce received from a verifier 30 and obtains a result.

On the other hand, the attestation method illustrated in FIG. 4B as described herein uses a random executable code A randomly selected by the attestation server 100. The executable code A is executed with respect to the certain application 12 in the smart device 10, and a result of execution is obtained.

By way of example, the executable code A may be generated by randomly combining a first hashed output, a section A constituting the original application file, a random value, a rearranged string, a second hashed output, and a section B constituting the original application file.

Therefore, whenever an attestation operation is carried out with respect to the certain application 12 in the smart device 10, an executable code A is changed, and it is not necessary to store or scan a signature. Thus, it is difficult for an attacker to analyze the attestation operation or make a malicious attack based on reverse engineering.

Figure 5:
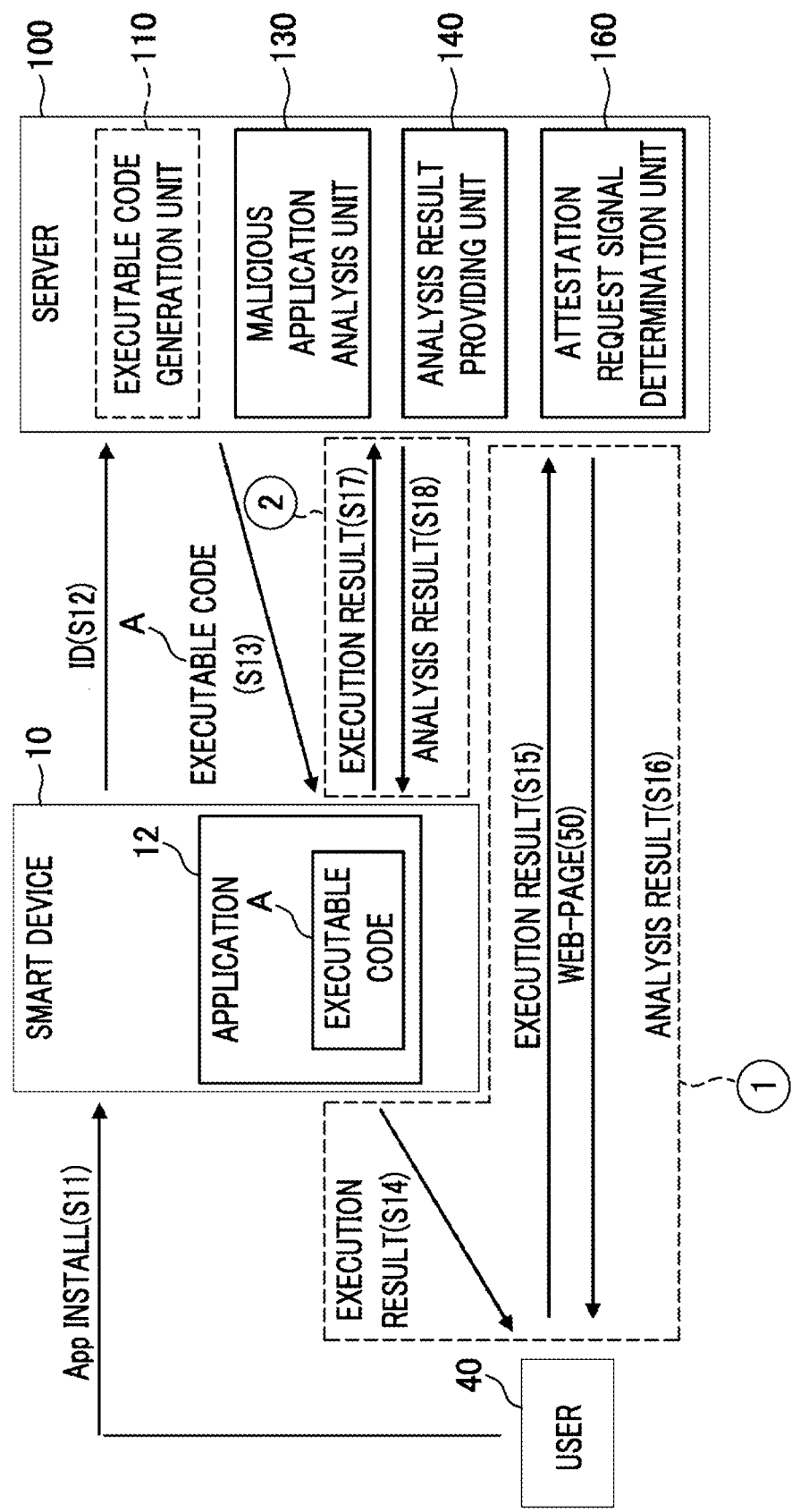
FIG. 5 is a diagram illustrating a configuration and an operation of an application attestation server in accordance with another example embodiment.

Meanwhile, FIG. 5 is a diagram illustrating a configuration and an operation of an application attestation server in accordance with another example embodiment.

The certain application 12 may be installed in the smart device 10 by a user 40 or may be preinstalled when the smart device 10 is released.

The smart device 10 transmits the identification (ID) of the smart device 10 to the attestation server 100 (S12), and the attestation server 100 identifies the smart device 10 using the ID and transmits an executable code A randomly selected from random executable codes generated by the executable code generation unit 110 to the smart device 10 (S13).

To be specific, the attestation server 100 may transmit the randomly selected executable code A, when the attestation server 100 receives an attestation request signal with respect to the certain application 12 from the smart device 10. In some cases, the attestation server 100 may transmit the randomly selected executable code A depending on variable or pre-set schedule regardless of the attestation request signal to the smart device 10.

In the smart device 10, an attestation operation with respect to a certain application is carried out by the selected executable code A, and a result of the attestation operation is transferred to the attestation server 100 indirectly by the user 40 or directly by the smart device 10.

Herein, a process of transferring the result of the attestation operation may vary depending on a determination result of an attestation request signal determination unit 160. The application attestation server 100 in accordance with another example embodiment may further include the attestation request signal determination unit 160 as illustrated in FIG. 5.

The attestation request signal determination unit 160 checks the attestation request signal received by the attestation sever 100, and makes a determination.

To be specific, the attestation request signal determination unit 160 may check an attestation request signal regularly/irregularly or may check an attestation request signal first received. The user can continuously monitor integrity of the certain application through the application attestation server including the attestation request signal determination unit 160.

To be more specific, the attestation request signal determination unit 160 can determine whether or not a received attestation request signal is a signal first received. That is, the attestation request signal determination unit 160 can determine the number of receipt of an attestation request signal.

By way of example, if a received attestation request signal is a signal first received from the smart device 10, the transceiver 120 receives a result of the attestation operation through a web page 50 connected to the attestation server 100 or a short message service (SMS) as indicated by ① (S15), and the analysis result providing unit 140 provides an analysis result of the malicious application analysis unit 130 through the web page 50 or the SMS (S16).

Herein, the result of the attestation operation is checked by the user 40 who uses the smart device 10 (S14), and then input by the user 40 through the web page 50 or the SMS (S15). To do so, each executable code generated by the executable code generation unit 110 may include information of a result transfer path indicated by ①, and instead of the web page 50 or the SMS, other means may be used.

By the above-describe method, the attestation server 100 can attest that a certain application has been a malicious application since it was downloaded from a market.

In another example, if a received attestation request signal is not a signal first received from the smart device 10, the transceiver 120 receives a result of the attestation operation from the smart device 10 as indicated by ② (S17), and the analysis result providing unit 140 provides an analysis result of the malicious application analysis unit 130 to the smart device 10 (S18).

To do so, each executable code generated by the executable code generation unit 110 may include information of a result transfer path indicated by ②.

By using the above-describe method, the attestation server 100 can attest that a certain application was normal until it was downloaded from a market but has been altered thereafter.

Hereinafter, referring to FIG. 6 and FIG. 7, detailed explanation will be provided.

Figure 6:
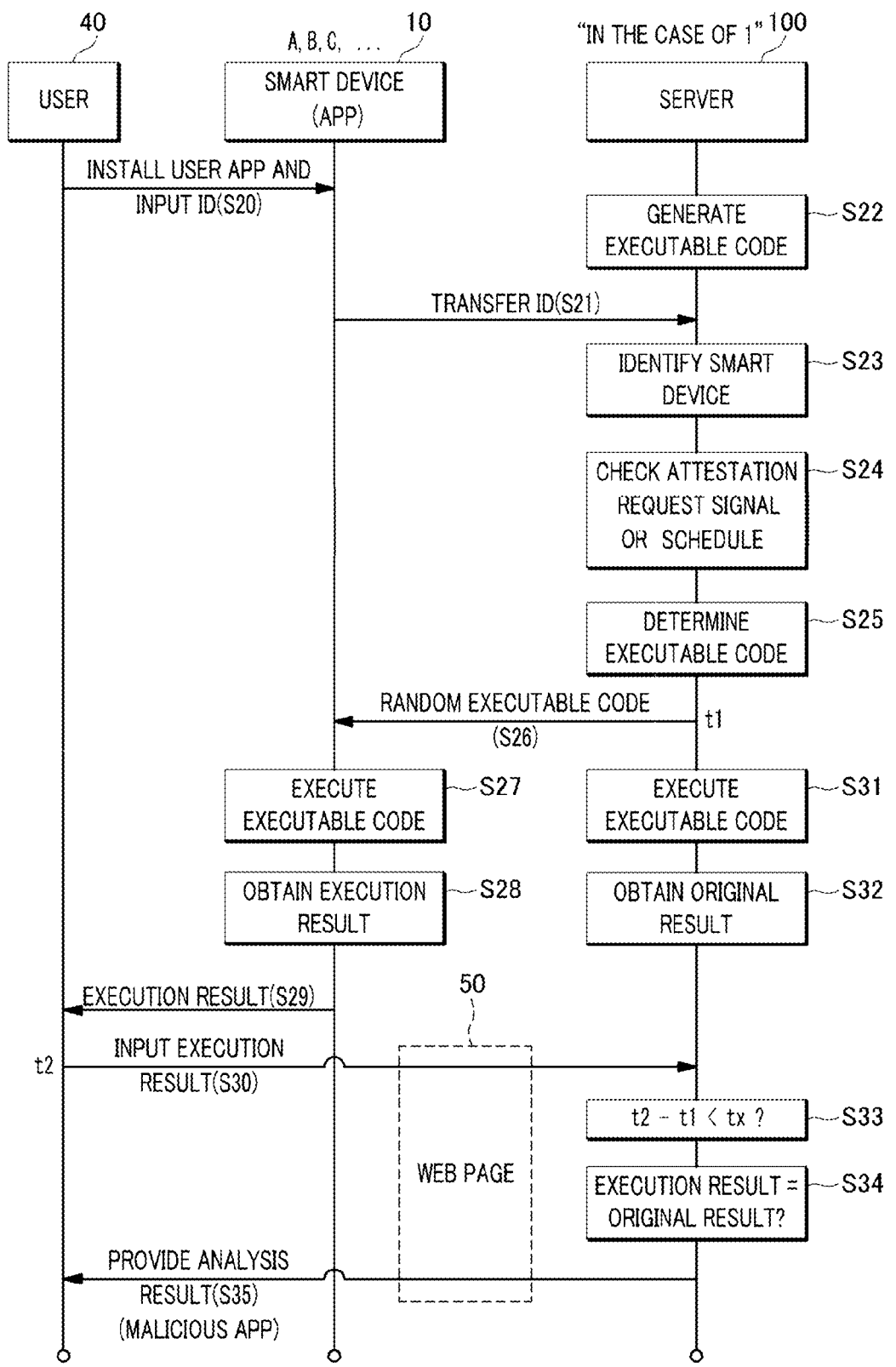
FIG. 6 is a flowchart provided for describing an operation ① of FIG. 5 in more detail.

FIG. 6 is a flowchart provided for describing an operation ① of FIG. 5 in more detail.

The user 40 can install the certain application 12 in his/her smart device 10 and input user identification information (ID) during installation (S20).

The smart device 10 transfers the user ID to the attestation server 100 for an attestation operation with respect to the certain application 12 (S21). In one example embodiment, the smart device 10 may transfer an attestation request signal with the user ID to the attestation server 100.

The attestation server 100 generates at least one or more random executable codes (S22), and determines which one of multiple smart devices A, B, C, . . . where the certain application is installed, based on the user ID (S23).

In one example embodiment, the attestation server 100 may check the attestation request signal received from the smart device 10 (S24).

In this case, an attestation request signal may be received regularly/irregularly from the smart device several times before or after the random executable codes are generated. Further, the attestation server 100 may check whether such an attestation request signal is a signal first received.

In another example embodiment, the attestation server 100 may check variable or pre-set schedule with respect to the random selection of executable code, regardless of the above attestation request signal (S24).

Then, the attestation server 100 randomly selects an executable code from the generated executable codes (S25), and transmits the randomly selected executable code and information of a result transfer path to the identified smart device 10 (S26). In this case, a time ($t_1$) for transmitting the randomly selected executable code to the smart device 10 is recorded in the attestation server 100.

To be specific, the attestation server 100 randomly selects an executable code and transmits it to the identified smart device 10, when the attestation request signal is received from a smart device in one example embodiment. Further, the attestation server 100 randomly selects an executable code and transmits it to the identified smart device 10, depending on variable or pre-set schedule in another example embodiment.

The smart device 10 performs an attestation operation with respect to the certain application 12 using the received executable code (S27), and obtains a result of the attestation operation (S28). Further, the smart device 10 displays the result of the attestation operation to the user 40 based on the information of the result transfer path (S29).

The user may access the web page 50 connected to the attestation server 100 and input the result of the attestation operation (S30). In this case, the attestation server 100 records a time ($t_2$) for receiving the result of the attestation operation.

The attestation server 100 executes the random executable code transferred to the smart device 10 with respect to an original application previously stored (S31) while the processes S27 to S30 are carried out, and obtains an original result (S32).

Further, the attestation server 100 checks whether a difference between the time ($t_1$) for transmitting the selected executable code to the smart device 10 and the time ($t_2$) for receiving the result of the attestation operation is within a reference time range ($t_x$) (S33). If the difference is within the reference time range ($t_x$), analysis on whether the certain application 12 is a malicious application is carried out.

The analysis is carried out based on the received result, and the attestation server 100 compares the original result (predicted result) with the received result (S34), and determines whether the certain application 12 is a normal application or a malicious application.

Further, the attestation server 100 provides an analysis result to the user through the web page 50 (S35). In this case, only when the certain application 12 is a malicious application, the analysis result is provided to the user, and when the certain application 12 is a normal application, an additional operation may not be carried out.

Figure 7:
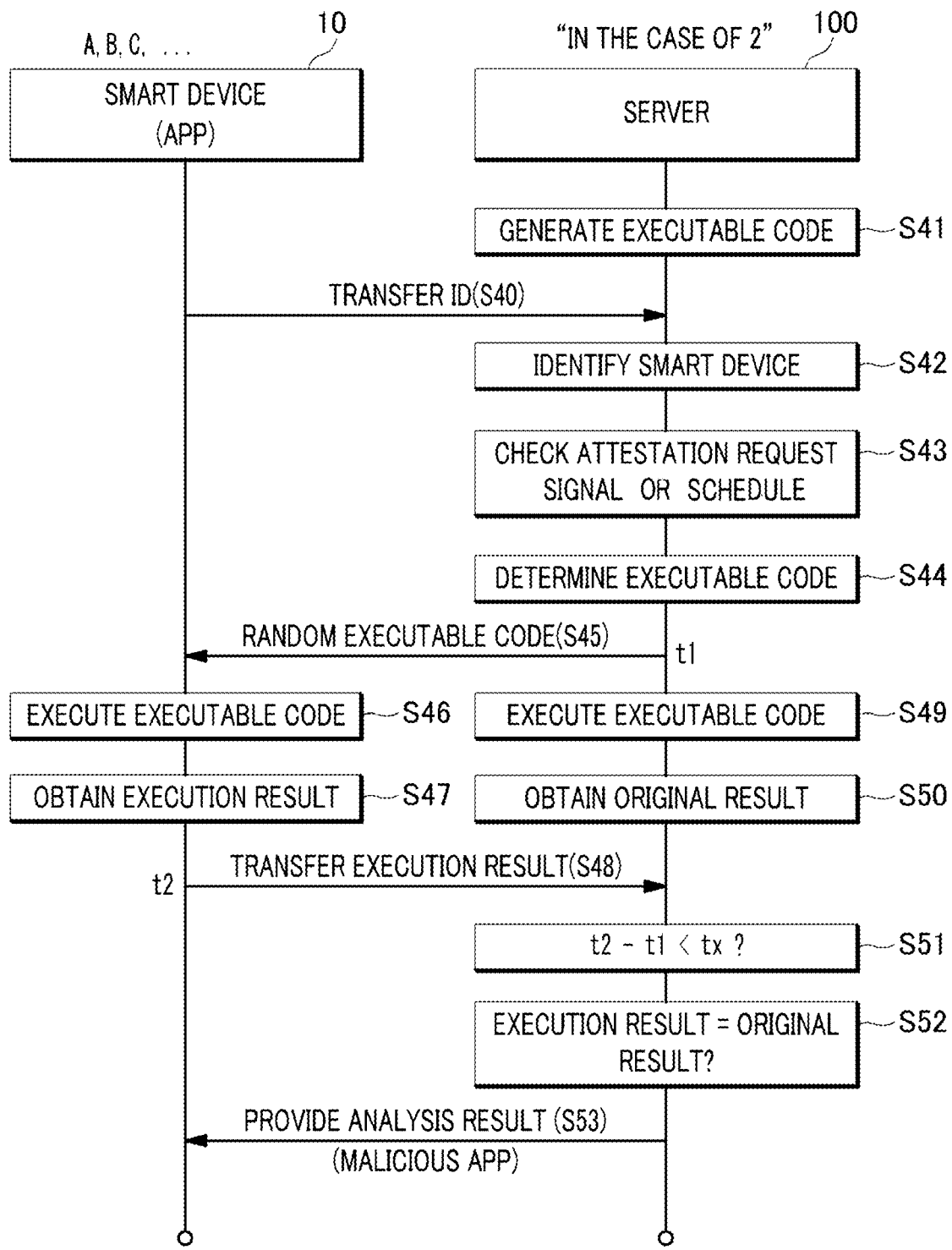
FIG. 7 is a flowchart provided for describing an operation ② of FIG. 5 in more detail.

FIG. 7 is a flowchart provided for describing an operation ② of FIG. 5 in more detail.

The smart device 10 transfers the user ID to the attestation server 100 for an attestation operation with respect to the certain application 12 (S40). The user ID may be input when the certain application 12 is installed in the smart device 10. In one example embodiment, the smart device 10 may transfer an attestation request signal with the user ID to the attestation server 100.

The attestation server 100 generates at least one or more random executable codes (S41) before or after the attestation request signal is received.

Further, the attestation server 100 determines which one of multiple smart devices A, B, C, . . . where the certain application is installed, based on the user ID (S42).

In one example embodiment, the attestation server 100 may check the attestation request signal received from the smart device 10 (S43).

In this case, an attestation request signal may be received regularly/irregularly from the smart device several times before or after the random executable codes are generated. Further, the attestation server 100 may check whether such an attestation request signal is a signal first received.

In another example embodiment, the attestation server 100 may check variable or pre-set schedule with respect to the random selection of executable code, regardless of the above attestation request signal (S43).

Then, the attestation server 100 randomly selects an executable code from the generated executable codes (S44), and transmits the randomly selected executable code and information of a result transfer path to the identified smart device 10 (S45). In this case, a time ($t_1$) for transmitting the randomly selected executable code to the smart device 10 is recorded in the attestation server 100.

To be specific, the attestation server 100 randomly selects an executable code and transmits it to the identified smart device 10, when the attestation request signal is received from a certain smart device in one example embodiment. Further, the attestation server 100 randomly selects an executable code and transmits it to the identified smart device 10, depending on variable or pre-set schedule in another example embodiment.

The smart device 10 performs an attestation operation with respect to the certain application 12 using the received executable code (S46), and obtains a result of the attestation operation (S47). Further, the smart device 10 transfers the result of the attestation operation to the attestation server 100 based on the information of the result transfer path (S48). In this case, the attestation server 100 records a time ($t_2$) for receiving the result of the attestation operation.

The attestation server 100 executes the random executable code transferred to the smart device 10 with respect to an original application previously stored (S49) while the processes S46 to S48 are carried out, and obtains an original result (S50).

Further, the attestation server 100 checks whether a difference between the time ($t_1$) for transmitting the selected executable code to the smart device 10 and the time ($t_2$) for receiving the result of the attestation operation is within a reference time range ($t_x$) (S51). If the difference is within the reference time range ($t_x$), analysis on whether the certain application 12 is a malicious application may be carried out. If the difference is out of the reference time range ($t_x$), analysis on whether the certain application 12 is a malicious application may be deferred or a request to carry out the above processes again may be transferred to the smart device 10.

The analysis is carried out based on the received result, and the attestation server 100 compares the original result (predicted result) with the received result (S52), and determines whether the certain application 12 is a normal application or a malicious application.

Further, the attestation server 100 transfers an analysis result to the smart device 10 to provide the analysis result to the user (S53). In this case, only when the certain application 12 is a malicious application, the analysis result is provided to the user, and when the certain application 12 is a normal application, an additional operation may not be carried out.

When the above-described server for attesting a certain application in a smart device is used, it is possible to rapidly and accurately determine whether or not a certain application is altered, and also possible to effectively respond to reverse engineering-based attacks.

<Application Attestation Method>

A method for attesting the certain application 12 in the smart device 10 by the attestation server 100 will be explained with reference to FIG. 8. For reference, the reference numerals of the respective components illustrated in FIG. 2 and FIG. 5 will be used for convenience of explanation.

Figure 8:
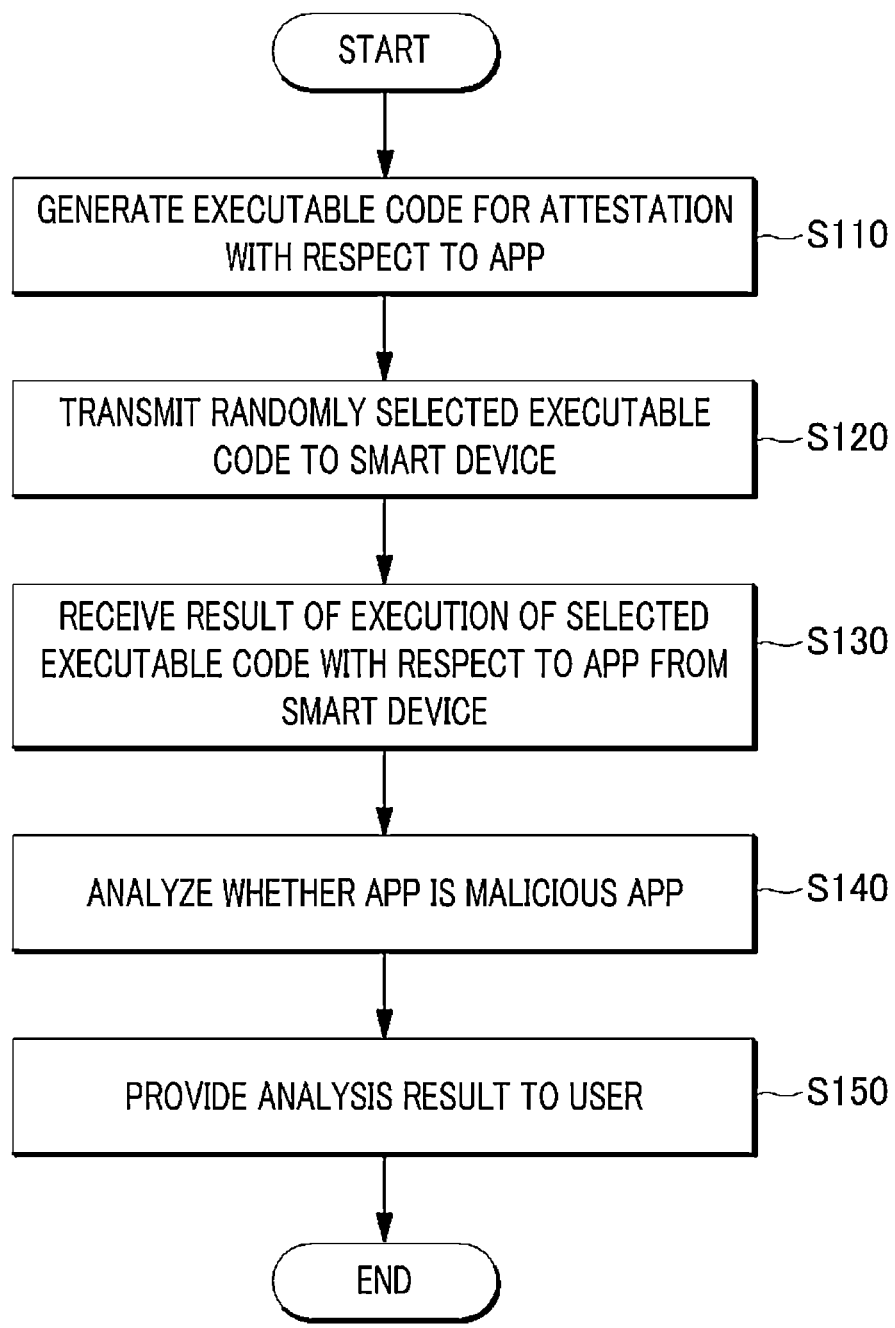
FIG. 8 is a flowchart provided for describing each step of an application attestation method in accordance with an example embodiment.

FIG. 8 is a flowchart provided for describing each step of an application attestation method in accordance with an example embodiment.

The attestation server 100 generates executable codes for attesting the certain application 12 by randomly combining information relevant to the certain application 12 (S110).

Herein, the information relevant to the certain application may include at least one or more of a specific function, a specific variable, a hash value of the specific variable, a specific string, and a string with a sequence rearranged, which constitute an original application file.

Then, the attestation sever 100 transmits an executable code randomly selected from executable codes for attestation with respect to the certain application 12 to the smart device 10 (S120). In this case, the executable code for attestation may be generated at any time during the process S110, or may be generated in another device and transferred to the attestation server 100.

To be specific, the attestation sever 100 may transmit the randomly selected executable code depending on pre-set or variable schedule to the smart device 10.

In some cases, if an attestation request signal is received from the smart device 10, the attestation server 100 may transmit the randomly selected executable code to the smart device 10.

Thereafter, the attestation server 100 receives a result of execution of the selected executable code with respect to the certain application 12 from the smart device 10 (S130).

Further, the attestation server 100 analyzes whether or not the certain application 12 is a malicious application based on the result received during the process S130 (S140).

To be specific, the attestation server 100 can compare the result receive during the process S130 with an original result of execution of the selected executable code with respect to an original application in the attestation server 100. If the original result is different from the received result, the attestation server 100 analyzes that the certain application 12 is a malicious application, and if the original result is the same as the received result, the attestation server 100 analyzes that the certain application 12 is a normal application.

In addition, the attestation server 100 checks whether a difference between the time for transmitting the randomly selected executable code to the smart device 10 and the time for receiving the result of the attestation operation is within a reference time range. If the difference is out of the reference time range, the attestation server 100 may defer analysis on whether the certain application 12 is a malicious application, and if the difference is within the reference time range, the attestation server 100 may carry out analysis on whether the certain application 12 is a malicious application.

Then, the attestation server 100 provides an analysis result of the process S140 to the user (S150).

Further, an application attestation method in accordance with another example embodiment may further include a process of checking and determining the attestation request signal received during the process S130.

Herein, as necessary, the attestation server 100 may check whether the received attestation request signal is a signal first received from the smart device 10, and make a determination.

If a determination is true (the number of receipt of an attestation request signal=1), the attestation server 100 receives a result of the attestation operation through the web page 50 connected to the attestation server 100 during the process S130 and provides an analysis result to the user through the web page 50 during the process S150.

If a determination is false (the number of receipt of an attestation request signal≠1), the attestation server 100 receives a result of the attestation operation from the smart device 10 during the process S130 and provides an analysis result to the user through the smart device 10 during the process S150.

In this case, only when the certain application 12 is a malicious application, the analysis result is provided to the user, and when the certain application 12 is a normal application, an additional operation may not be carried out.

Further, when the technique as described herein was actually applied, it took an average time of about 0.49 seconds for a smart device to carry out an attestation operation using a random executable code, and it took an average time of about 0.13 seconds for an attestation server to execute a selected executable code with respect to an original application.

Thus, it can be confirmed that a resource is required by a smart device to be attested and an attestation server at a very low level. Further, with this application attestation method, a user can rapidly and accurately determine whether or not a certain application is altered and can also effectively respond to reverse engineering-based attacks.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An application attestation server that attests a certain application in a smart device, the application attestation server comprising:
   an executable code generator that generates executable codes for attestation with respect to the application;
   a memory storing executable codes that are executed by a hardware processor to perform an operation with respect to the application from the smart device;
   a transceiver that transmits an executable code randomly selected from the generated executable codes to the smart device when an attestation request signal is received from the smart device, and receives a result of execution of the selected executable code with respect to the application from the smart device;
   an attestation request signal determination result provider that determines whether the received attestation request signal is firstly received;
   a malicious application analyzer that analyzes whether the application is a malicious application based on the received result; and
   an analysis result provider that provides an analysis result of the malicious application analyzer to a user,
   wherein the executable code generator generates the executable codes by randomly combining information relevant to the application,
   the transceiver receives the result of execution of the selected executable code through one of more than one different paths depending on a result of determination about whether the received attestation request signal is firstly received,
   the analysis result provider provides the analysis result through a path where the result of execution is received, and
   the executable code generator generates the executable code by dividing results of hash functions of the application into blocks and rearranging thereof based on a complexity of a method of altering the results of the hash functions.

2. The application attestation server of claim 1, further comprising:
   a memory that stores the information relevant to the application,
   wherein the information relevant to the application includes at least one or more of a specific function, a specific variable, a hash value of the specific variable, a specific string, and a string with a sequence rearranged, which constitute an original application file.

3. The application attestation server of claim 1,
   wherein the transceiver transmits the selected executable code depending on variable schedule to the smart device.

4. The application attestation server of claim 1,
   wherein when the received attestation request signal is firstly received from the smart device, the transceiver receives the result of execution through a web page connected to the server and the analysis result provider provides the analysis result through the web page, and
   when the received attestation request signal is not firstly received from the smart device, the transceiver receives the result of execution from the smart device and the analysis result provider provides the analysis result to the smart device.

5. The application attestation server of claim 1,
   wherein the malicious application analyzer includes a result comparator that compares an original result of execution of the selected executable code with respect to an original application in the server with the received result, and
   the malicious application analyzer determines whether the application is a normal application or a malicious application based on a comparison result of the result comparator.

6. The application attestation server of claim 5,
   wherein the malicious application analyzer further includes a time checker that checks whether a difference between a time for transmitting the selected executable code to the smart device and a time for receiving the result of execution is within a reference time range, and
   the malicious application analyzer defers or carries out analysis on whether the application is a malicious application depending on a check result of the time checker.

7. An application attestation method for attesting a certain application in a smart device by a server, the application attestation method comprising:
   generating executable codes, by a generator, for attestation by randomly combining information relevant to the application;
   storing the generated executable codes in a memory to be executed by a processor that performs an operation with respect to the application from the smart device;
   transmitting, through a transceiver, an executable code randomly selected from executable codes for attestation with respect to the application to the smart device when an attestation request signal is received from the smart device;
   receiving, through the transceiver, a result of execution of the selected executable code with respect to the application from the smart device;
   determining whether the received attestation request signal is firstly received from the smart device;
   analyzing whether the application is a malicious application based on the received result; and
   providing an analysis result of the analyzing process to a web page connected with the server or the smart device,
   wherein the receiving process comprises receiving the result of execution of the selected executable code through one of more than one different paths depending on a result of determination about whether the received attestation request signal is firstly received,
   the providing process comprises providing the analysis result through a path where the result of execution is received, and
   the generating process comprises generating the executable code by dividing results of hash functions of the application into blocks and rearranging thereof based on a complexity of a method of altering the results of the hash functions.

8. The application attestation method of claim 7, wherein the information relevant to the application includes at least one or more of a specific function, a specific variable, a hash value of the specific variable, a specific string, and a string with a sequence rearranged, which constitute an original application file.

9. The application attestation method of claim 7, wherein the transmitting process transmits the selected executable code depending on variable schedule to the smart device.

10. The application attestation method of claim 7, wherein when the received attestation request signal is firstly received, the result of execution is received through a web page connected to the server in the receiving process and the analysis result is provided through the web page in the providing process, and when the received attestation request signal is not firstly received, the result of execution is received from the smart device in the receiving process and the analysis result is provided to the smart device in the providing process.

11. The application attestation method of claim 7, wherein the analyzing process includes comparing an original result of execution of the selected executable code with respect to an original application in the server with the received result, and
if the original result is different from the received result, it is analyzed that the application is a malicious application.

12. The application attestation method of claim 11, wherein the analyzing process includes:
checking whether a difference between a time for transmitting the selected executable code to the smart device and a time for receiving the result of execution is within a reference time range; and
deferring analysis on whether the application is a malicious application when the difference is out of the reference time range.

* * * * *